(12) United States Patent
Choi

(10) Patent No.: US 11,052,305 B2
(45) Date of Patent: Jul. 6, 2021

(54) CURLING GAME APPARATUS

(71) Applicant: Hae-Yong Choi, Seoul (KR)

(72) Inventor: Hae-Yong Choi, Seoul (KR)

(*) Notice: Subject to any disclaimer, the term of this patent is extended or adjusted under 35 U.S.C. 154(b) by 0 days.

(21) Appl. No.: 16/157,235

(22) Filed: Oct. 11, 2018

(65) Prior Publication Data

US 2020/0061452 A1 Feb. 27, 2020

(30) Foreign Application Priority Data

Aug. 27, 2018 (KR) .................. 10-2018-0100596

(51) Int. Cl.
*A63F 7/00* (2006.01)

(52) U.S. Cl.
CPC .................... *A63F 7/0005* (2013.01)

(58) Field of Classification Search
CPC ............... F41J 5/00; F41J 5/05; A63F 7/00
USPC ............ 273/126 R, 127 R, 126 A, 108, 371, 273/118 R; 463/54, 49
See application file for complete search history.

(56) References Cited

U.S. PATENT DOCUMENTS

| | | | | |
|---|---|---|---|---|
| 2,509,666 A * | 5/1950 | Armstrong | ............. | A63B 63/08 273/382 |
| 2,900,189 A * | 8/1959 | Howlett | .................... | A63F 7/06 273/126 R |
| 3,239,226 A | 3/1966 | Matte | | |
| 3,762,711 A * | 10/1973 | Cooper | ................. | A63F 7/0005 273/126 R |
| 4,017,078 A * | 4/1977 | Goldfarb | ............... | A63F 7/3603 273/126 A |
| 4,549,735 A * | 10/1985 | Dunn, Jr. | ............... | A63D 15/06 473/31 |
| 5,011,147 A * | 4/1991 | Thomas | ................. | A63B 67/14 273/126 A |
| 5,382,022 A * | 1/1995 | Cook | ..................... | A63B 67/14 273/118 R |
| D472,584 S * | 4/2003 | Perry | ........................... | D21/321 |
| 8,435,127 B2 * | 5/2013 | Boessling | .............. | A63D 15/00 473/10 |
| 2007/0075487 A1* | 4/2007 | Silva | ..................... | A63F 7/0005 273/126 R |
| 2011/0037225 A1* | 2/2011 | Woodhall | .............. | A63F 9/0208 273/317.2 |

(Continued)

FOREIGN PATENT DOCUMENTS

KR 2015-0003626 U 10/2015
KR 10-1586685 B1 1/2016

*Primary Examiner* — Eugene L Kim
*Assistant Examiner* — Rayshun K Peng
(74) *Attorney, Agent, or Firm* — Bacon & Thomas, PLLC

(57) ABSTRACT

A curling game apparatus including a main body, a curling table provided on the upper end of the body, and a curling ball formed in the perfect spherical shape as a rigid body and moved on the curling table. The curling table includes an upper plate provided along a bottom surface and a periphery of an upper end of the main body, a plurality of cushion bars provided inside the upper plate, and an upper plate surface portion horizontally provided on a surface of the upper plate. The upper plate surface portion is provided with at least one hit line for hitting the curling ball and at least one target to which the curling ball starts from the hit line by hitting to reach. The curling ball is reflected by the cushion bars to move to the target while the curling ball rotates with the hitting point thereof.

2 Claims, 9 Drawing Sheets

(56) References Cited

U.S. PATENT DOCUMENTS

2014/0204347 A1\* 7/2014 Murphy ............. G03B 21/2033
  353/57
2018/0117434 A1\* 5/2018 Krueger ................ A63F 7/0005

\* cited by examiner

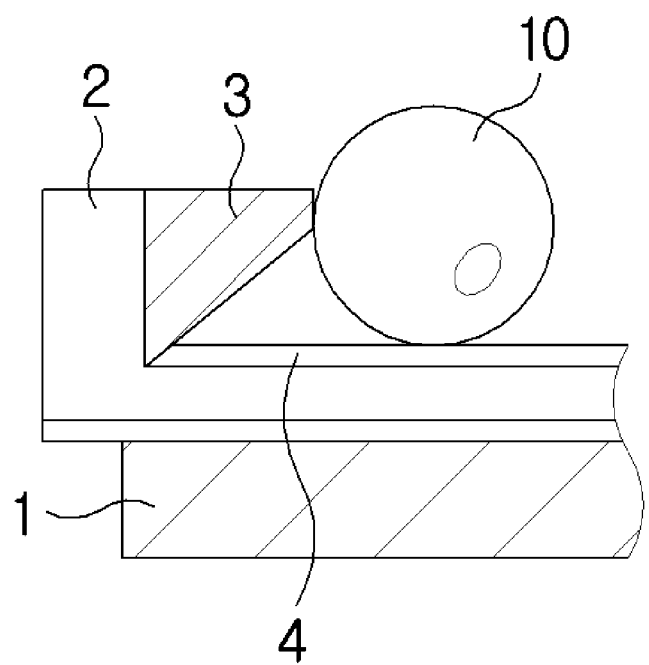

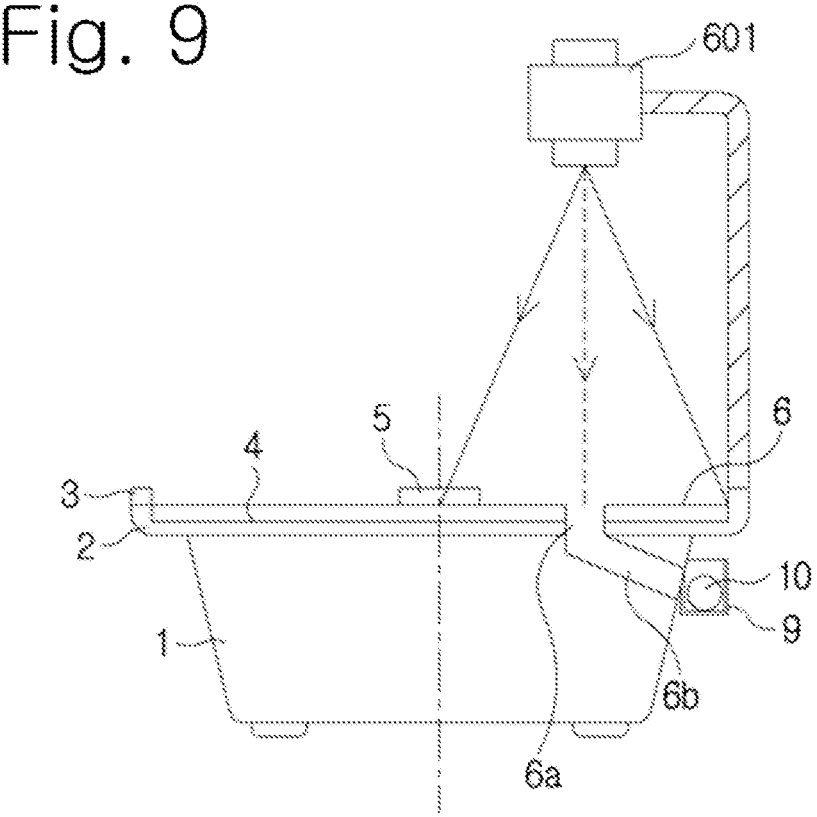

CURLING GAME APPARATUS

CROSS-REFERENCE TO RELATED APPLICATION

This application claims under 35 U.S.C. § 119(a) the benefit of Korean Patent Application No. 10-2018-0100596 filed on Aug. 27, 2018, the entire contents of which are incorporated herein by reference.

The present invention relates to a curling game apparatus capable of enjoying a curling game on a table, and more particularly, to a curling game apparatus capable of enjoying curling sports by cushions and strokes at various angles on a table provided indoors.

BACKGROUND OF THE INVENTION

In general, curling is a winter sport that determines the win or loss according to how two teams have placed more accurately curling stones on a fixed target of a rectangular ice link called the curling sheet by sliding the curling stones and this curling game is played between two teams of four players per team.

This curling game was considered to start firstly in Scotland and have been popular in the 16th century. In the early days, stone was used and in the 1800s, iron was used instead of stone. Today, stone (stones) having weight of 20 kg or less, periphery of 914 cm or less and height of 114 cm is (are) used at present.

The curling game is played between two teams, each composed of four players, which is a kind of winter sports in which two stones are slid alternately with the opponent team toward the target in a circle called house on the ice link (ice sheet) with a width of 4.72 to 5 m, a length of 42.07 to 45.72 m, one side of which is very long and wide as a width to length ratio of 1:9 and the score is competed according to which side is closer to the target.

In this curling game, a team, that alternately casts an elliptical curling stone having a weight of 19.96 kg and a circumference of 91.44 cm on the ice sheet to put the curling stone finally closest to the target center of the house having a diameter of 3.658 m by means of a draw attack to place a curling stone at a desired position and a take-out attack to strike a curling stone of the opponent.

However, such a curling game requires a wide and long space and ice sheets, so there are limitations as a public sport due to various obstacles such as limitation of a place, ice quality maintenance, and the like.

In addition, when a curling table is used to popularize a curling game, since a long curling table having a width-to-length ratio of 1 to 9 is required, it is practically difficult to install several tables indoor, and it can be installed only in a specific type of room.

One example of such a technique is disclosed in the Documents 1 to 3 below.

For example, Korean Utility Model Publication No. 2015-0003626 (published Oct. 6, 2015) discloses a curling game apparatus using putting, comprising a first detection unit including a mat provided with a plurality of detection sensors arranged in a lattice form on the lower portion thereof and detecting a golf ball putted from a supply unit by the detection sensors; a second detection unit including a mat provided with a plurality of detection sensors arranged in a circular form around the center of an end thereof, and transmitting the ID of the detection sensor which lastly detected the golf ball to a control unit through a second transmission unit when the detection sensor detects the golf ball moved passing the first detection unit; a control unit generating golf ball trace information by linearizing the change trend in the coordinate corresponding to the ID of the detection sensor received from the first detection sensor, and generating the score information for outputting a predetermined score so as to correspond to the ID of the detection sensor received from the second detection sensor; and a display unit displaying the golf ball trace information and the score information received from the control unit.

In addition, Korean Patent 10-1586685 (Registered on Jan. 13, 2016) discloses a curling game machine that determines the win or loss of the game according to whether the chip thrown into the moving path enters the target position, comprising: a shooter throwing forward a chip while controlling strength and weakness of the chip; a moving path wherein the chip thrown from the shooter is slid and at least one or more targets are formed; and a chip recovering means for recovering the chip toward the side direction of the moving path, wherein air holes are formed in the moving path so that the chip slides while being lifted by the air discharged to the air holes by the air compressor.

Meanwhile, U.S. Pat. No. 3,239,226 (published on Mar. 8, 1966) discloses a miniature game machine for performing a curling game on a long table by providing a horizontal support, a flat game board provided on the horizontal support, an operation frame, and a pivoting means for pivoting the movement of the operation frame.

The above information disclosed in this Background section is only for enhancement of understanding of the background of the invention and therefore it may contain information that does not form the prior art that is already known in this country to a person of ordinary skill in the art.

SUMMARY OF THE INVENTION

In the techniques disclosed in the above-mentioned patent documents, the curling game is difficult to be applied indoors and the curling brush bromine adjustment for adjusting the moving speed direction of the curling stone is practically impossible on the curling table, and thus the game content itself becomes very monotonous.

Although the above Korean Utility Model Publication No. 2015-0003626 also discloses a method of simulating a curing game in the form of a screen, since the real feeling is lowered and the determined form and situation are controlled by a computer, there was a problem that various playing methods, which are important elements of sports, were not created.

In addition, although Korean Patent 10-1586685 discloses a structure for rolling downward a curling ball on a sloping start line, there is a problem that the attack and the defensive method are simple since there is no special attack method other than selecting the drop point of falling curling ball.

There was also a problem in the structure of a curling table disclosed in the above U.S. Pat. No. 3,239,226 in which a curling game is played on a merely long table, and thus the shape of such a curling table is limited in the indoor installation thereof. Also, since the shape of the ball to be used is an incomplete sphere composed of concave depressed portions for accommodating the ball with a thumb, the rotation direction of the ball is rotatable only in one direction which is the left and right horizontal direction, and the attacking method is monotonous.

Moreover, there was also a problem in the technique disclosed in the above-mentioned patent documents and the like that since the cushion rail formed on one surface of the curling table is merely a blocking wall that prevents the ball from falling out to the outside, the motion impact of the moving ball is absorbed, the acceleration force of the ball is reduced, and the motion force thereof is stopped.

As described above, there was a problem in the conventional table-type structure that it was difficult to activate as a popular sport since the competition way is monotonous and the system occupies an installation space excessively long in only one direction to lead to installation restriction in various types of indoor spaces.

Meanwhile, conventional curling stones are elliptical type or not full sphere type, and thus only rotate in one direction. As such, since the reflection angle simply acts only on the left and right directions by the cushion, it only serves as a blocking wall for keeping it out of line and the attack and defensive means are very monotonous by using the stones.

Therefore, a new curling apparatus for an indoor curling table having a small size to be installed indoor, having various types of structures and a long moving distance for enjoying a curling game has been required, in which a variety of creative attack and defense methods can be made.

To solve the above-mentioned problems, the object of the present invention is to provide a curling game apparatus of a short length provided with a structure of a rectangular curling table so that a plurality of pieces can be installed in various types of indoor spaces.

Another object of the present invention is to provide a curling game apparatus having a function of a curling table of a long moving distance like a conventional curling game, thereby realizing a game running method for performing diverse, creative and various attacking and defending methods.

It is still another object of the present invention is to provide a curling game apparatus capable of performing a curling game by newly presenting the length and width of a curling table, the structure of a curling ball, the method of moving a curling ball, the movement length of a curling ball, the surface of a table where curling ball is easy to move, the structure of a cushion stand, the structure and position of the hitting line, the configuration method and location of the target, and the like.

In order to achieve the above-described object, according to the present invention, a curling game apparatus is provided, capable of performing a curling game on a table, comprising a main body, a curling table provided in a rectangular shape on the upper end of the body, and a curling ball formed in the perfect spherical shape as a rigid body and moved on the curling table, wherein the curling table includes an upper plate provided along a bottom surface and a periphery of an upper end of the main body, a plurality of cushion bars provided inside the upper plate, and an upper plate surface portion horizontally provided on a surface of the upper plate, wherein the upper plate surface portion is provided with at least one hit line for hitting the curling ball and at least one target to which the curling ball starts from the hit line by hitting to reach, wherein the target is formed by overlapping a plurality of circles or a plurality of polygons, wherein the curling ball is reflected by the cushion bars to move to the target while the curling ball rotates with the hitting point thereof struck at the hitting line as the center of mass and rotation shaft, and thereby the moving distance of the curling ball is longer than the length of the curling table.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 3 is a partial perspective view for explaining the height of the cushion stand and the state of the curling ball shown in FIG. 1;

FIG. 9 is a view illustrating a use state of the target light projector shown in FIG. 8.

Figure 1:
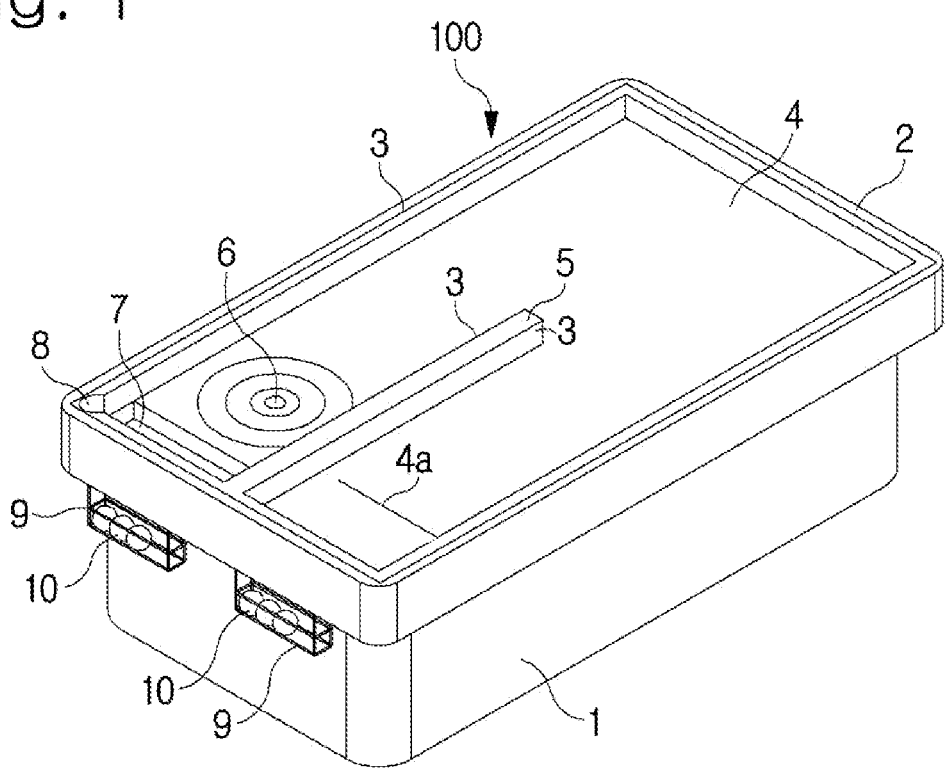
FIG. 1 is a perspective view for explaining a basic configuration of a curling game apparatus according to a first embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Hereinafter reference will now be made in detail to various embodiments of the present invention, examples of which are illustrated in the accompanying drawings and described below. The present invention is not limited to the typical or dictionary meanings of the terms or words used in the specification or the claims of the present application. In addition, the dimensions provided in this specification are intended to show specific effects and are not intended to limit the size limitation or dimension, but to provide for helping an understanding of the regulation of a sports game.

The curling game apparatus according to the present invention is composed of all the components of the game proportionally at the same rate, based on the international standard of a general ice link stadium (hereinafter referred to as the ice link stadium).

That is, the curling table is composed of an upper plate on the upper portion of the main body wherein the ratio of width to length of the upper plate is set to be at least 1:2 and a maximum of 1:4 so as to be installed in various types of rooms.

In addition, the middle cushion bar and peripheral cushion bar are composed of at least two sides and a maximum of six sides so that the ratio of the total movement distance of the curling ball which starts from the hitting line of the curling table to the target through the cushion of the cushion stand to the width of the curling table is from 1:6 or more to 1:10 or less.

This cushion bar is made of urethane, rubber, or the same such that a perfect angle of triangular shape is exposed the surface at a height of 40% to 90% of the diameter of the curling ball.

In addition, the curling ball is formed by a rigid body, which is formed as a ball of a perfect spherical shape, and the method of moving the curling ball is to hit one point of the curling ball as a hitting point to be rotated at various angles by using a cue stick on the hitting line.

The positions of the hitting line of the curing ball and the house (hereinafter referred to as the "target") are set by adjusting each position and shape such that the curling ball can move at a ratio of the width of the curling table to the total movement distance of the curling ball from 1:6 to 1:10 based on 1:9.

Hereinafter, embodiments according to the present invention will be described with reference to the drawings.

Embodiment 1

The configuration of a first embodiment of the curling game apparatus according to the present invention is described with reference to FIG. 1 to 3.

Figure 2:
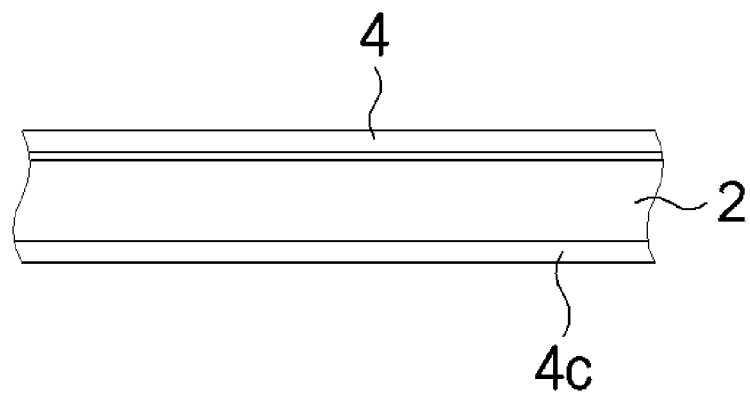
FIG. 2 is a partial cross-sectional view of the curling table shown in FIG. 1.

FIG. 1 is a perspective view for explaining a basic configuration of a curling game apparatus according to a first embodiment of the present invention, FIG. 2 is a partial cross-sectional view of the curling table shown in FIG. 1, and FIG. 3 is a partial perspective view for explaining the height of the cushion stand and the state of the curling ball shown in FIG. 1.

As shown in FIG. 1, the curling game apparatus according to the first embodiment of the present invention includes a main body 1, a curling table 100 provided at an upper portion of the main body 1, a curling ball 10 formed in a shape of a perfect spherical form as a rigid body and moved on the curling table 100.

As shown in FIG. 1, the curling table 100 is provided in a substantially rectangular shape on the main body 1, and is formed with a width-to-height ratio set so as to maintain the characteristics of a curling game and has a maximum movement distance with a minimum size considering being installed indoor.

As shown in FIGS. 1 and 3, the curling table 100 includes an upper plate 2 provided in a square shape along the bottom surface of the upper end of the main body 1 and the periphery thereof, a cushion bar 3 provided inside the upper plate 2, a upper plate surface portion 4 horizontally provided on the surface of the upper plate 2, and an intermediate cushion bar 5 arranged by extending from the cushion plate 3 to a central portion of the upper plate surface portion 4. The both sides of the intermediate cushion bar 5 have a cushion function.

As shown in FIGS. 2 and 3, the upper plate 2 may be formed of a supporting frame for fixing the upper plate to the main body 1 and a plurality of stone slabs laminated on the upper plate, and a heat transfer plate 4c provided with heat wires for controlling the humidity may be mounted on the lower portion of the upper plate 2.

As shown in FIG. 3, the cushion bar 3 is flush with the surface of the upper plate 2, and is inclined at an angle of about 45 degrees with respect to the upper plate surface portion 4, and is provided with a contact surface where contact with the curling ball 10 can be minimized. The cushion bar 3 is provided with more than two sites and less than six sites around the upper plate surface portion 4.

In other words, the cushion bar 3 and the intermediate cushion bar 5 of the curling game apparatus according to the present invention may include four cushion portions in front, rear, left, and right, and an intermediate cushion portion arranged in both sides of the left and right or one side.

The upper plate surface portion 4 is made of a metal such as stainless steel or aluminum having flatness, a stone material having a solid surface, a plastic material, or a urethane material. In addition, the above-mentioned metal or other material is covered with flock papers or microfibers so as to minimize the frictional force with the curling ball 10 made of a rigid body to be moved.

That is, for example, in the case of the flock paper, it is formed of fiber or plate material which does not cause fuzz like the flock paper in which a wool component and a nylon or polyester component are properly mixed so as to facilitate the movement of the curling ball 10.

Commonly, the material of the upper plate surface portion 4 is made of a material which has a good abrasion and on which the curling ball 10 having a rigid body characteristic can be moved continuously and uniformly. As shown in FIG. 3, the top plate 2 which is robust like a stone slab is provided at the lower portion of the upper plate surface portion 4, and a water removal device such as a heat transfer plate 4c can be selectively provided at the lower portion of the top plate.

As shown in FIG. 1, the intermediate cushion bar 5 is provided in the middle of the width of the upper plate surface portion 4, and has a width obtained by dividing the width of the upper plate surface portion 4 into two of left and right.

The length of the intermediate cushion bar 5 is set to a predetermined length on the basis of the length of the top plate 2, a portion of the upper plate surface portion 4 is divided into left and right portions by the intermediate cushion bar 5, and the top portion of the intermediate cushion bar 5 is mutually communicated.

The both surfaces of left and right, or one surface of the intermediate cushion bar 5 described above have the same function as the cushion bar 3, respectively. For reference, when the length of the intermediate cushion bar 5 is less than 30% of the length of the upper plate surface portion 4, there is a limit in the cushion reflection angle, and when the length thereof is 70% or more, there is a limitation in the angle of incidence and the angle of reflection of which the curling ball 10 moves from the upper plate surface portion 4 on the left side to the upper plate surface portion 4 on the right side.

In addition, as shown in FIG. 1, a hitting line 4a for moving the culling ball 10 by hitting it and a target 6 on which the struck curling ball 10 is moved to reach are provided on the upper plate surface portion 4. For an example, the hitting line 4a is provided on the right side of the culling table 100 and the target 6 is provided on the left side on the basis of the intermediate cushion bar 5, shown in FIG. 1.

The shape of the target 6 may be obtained by superimposing a plurality of circles or by superimposing polygons such as a plurality of triangles or squares as shown in FIG.

1, thereby measuring the position of the curling ball 10 on the basis of the center position of the target 6.

Meanwhile, the curling game apparatus according to the present invention is provided with a ball guide groove 7 at the lower portion of the target 6 provided on the upper plate surface portion 4, that is, between the target 6 and the cushion bar 3, a ball outlet 8 for withdrawing the curling ball 10 guided along the ball guide groove 7 from the curling table 100, and a curling ball storage portion 9 for storing the curling ball 10 discharged from the ball outlet 8, as shown in FIG. 1.

The ball outlet 8 is provided at an edge portion of the cushion bar 3 adjacent to a portion where the ball guide groove 7 is provided as shown in FIG. 1, and may be provided so as to communicate with the curling ball storage portion 9. In addition, the curling portion storage portion 9 may be provided at two places of the lower portion of the curling table 10, as shown in FIG. 1, for the two teams performing the curling game.

The curling balls 10 are provided in different colors according to two teams performing a curling game, and four or more curling balls may be provided according to the rules of the game.

Next, the size, structure, and operating method of the curling table 10 applied to the curling game apparatus according to the present invention will be described with reference to FIGS. 4A, 4B and 5.

Figure 4A:
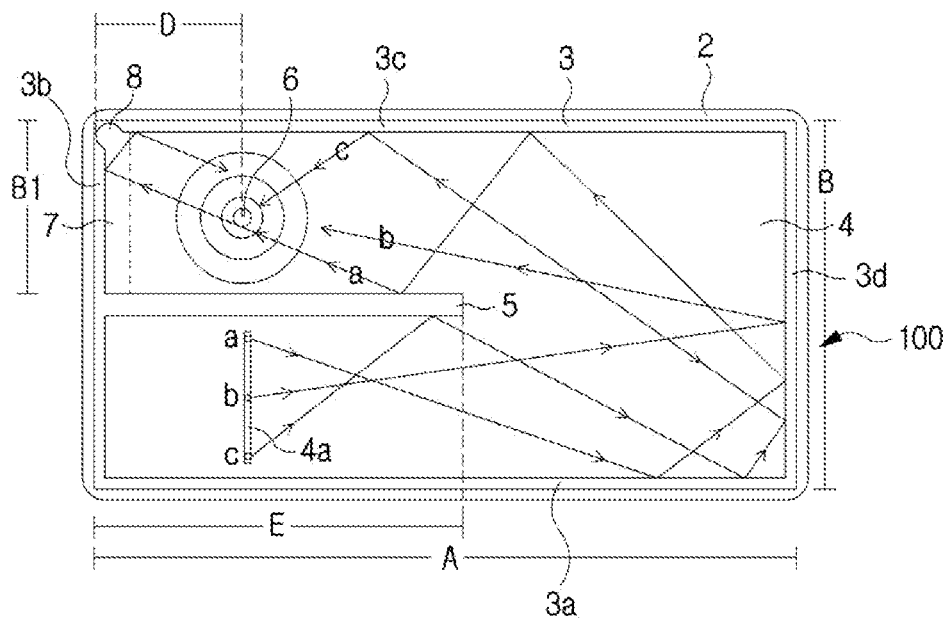
FIG. 4A is a view for explaining an example of a moving path of a curling ball and an operation process of the curling game on the curling table of a curling game apparatus according to the present invention.
Figure 4B:
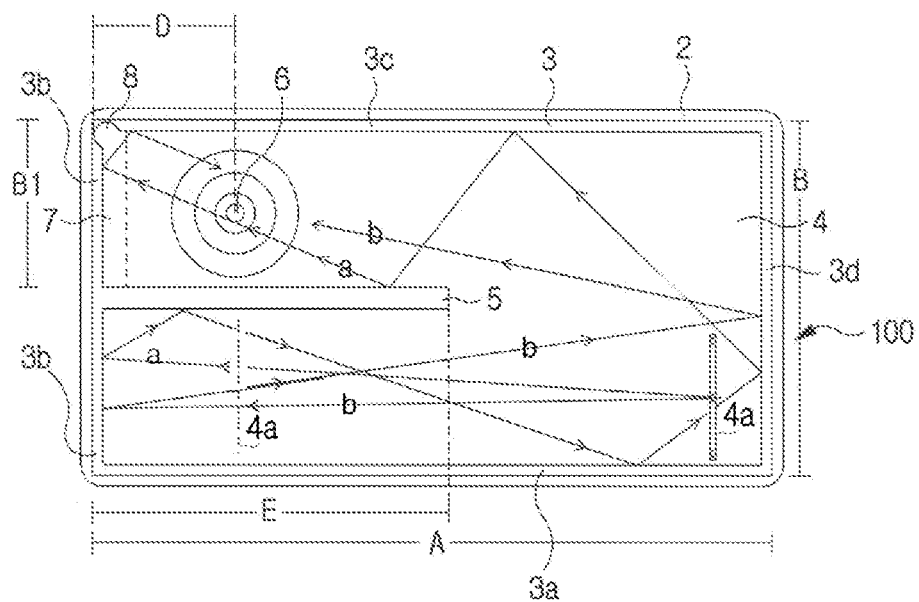
FIG. 4B is a view for explaining another example of a moving path of a curling ball and a curling game on the curling table of a curling game apparatus according to the present invention.
Figure 5:
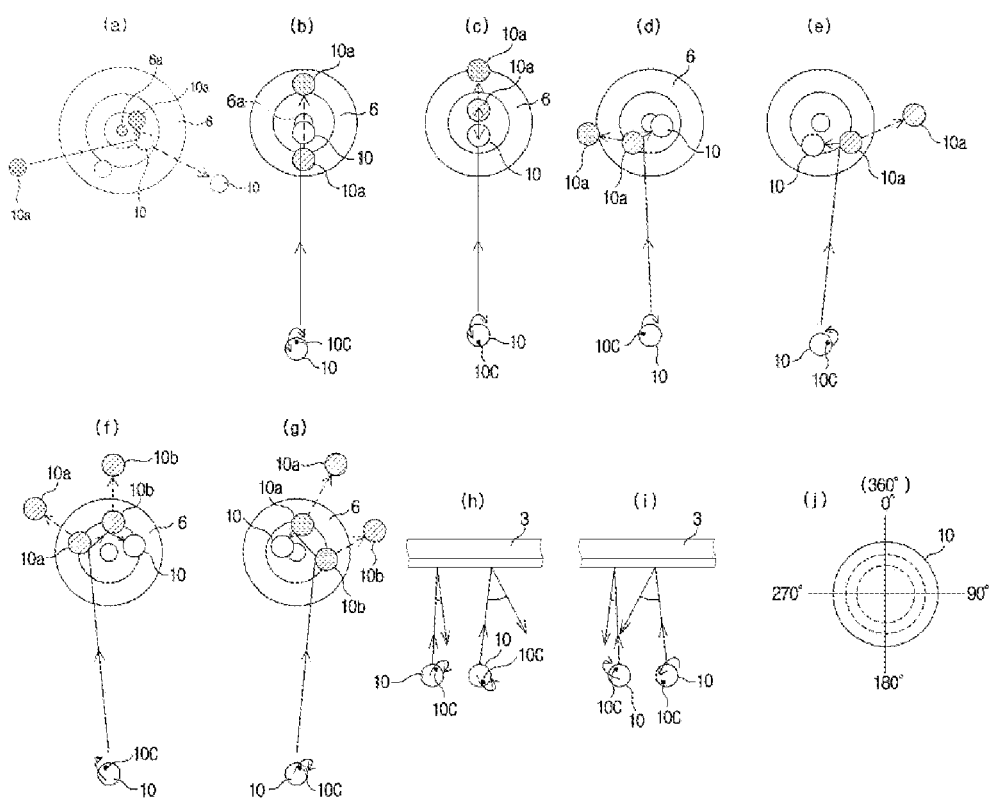
FIG. 5 is a view for explaining a moving process of the curling ball according to the hitting direction of the curling ball in the curling game apparatus according to the present invention.

FIG. 4 is a view for explaining a movement path of a curling ball on the curling table of the curling game apparatus according to the present invention and a process of operating a curling game wherein FIG. 4A is a view for explaining an example of a moving path of a curling ball and an operation process of the curling game on the curling table of a curling game apparatus according to the present invention and FIG. 4B is a view for explaining another example of a moving path of a curling ball and a curling game on the curling table of a curling game apparatus according to the present invention, and FIG. 5 is a view for explaining a moving process of the curling ball according to the hitting direction of the curling ball in the curling game apparatus according to the present invention.

The moving distance on the curling table of the curling game apparatus according to the present invention refers to the distance that the curling ball 10 starts from the hitting line 4a to reach the target 6 by repeated reflection from the plurality of cushion bars 3. The cushion bar 3 includes front, rear, left and right cushion bars 3b, 3d, 3a and 3c as shown in FIGS. 4A and 4B.

In addition, the ratio of the moving distance refers to the ratio of total movement distance on the basis of the width of the curling table 100 or the width B1 in which the width of the curling table 100 is divided into left and right.

The total movement distance of the curling ball 10 is set to be between at least 1:6 and 1:10 on the basis of the ratio of the width to the total length of the curling table 100.

If the total movement distance is set to be less than 1:6, the difficulty of the curling game is reduced, and if it is 1:10 or more, it causes the excessive size of the curling table 100 and installation number thereof is limited, so that it is not suitable for indoor installation.

To achieve this purpose, the positions of the cushion bar 3, the target 6, and the hitting line 4a may be adjusted in an efficient position.

For example, the width of the curling table 100, shown in FIG. 1, is set more than 0.6 m and less than 2 m and the length of the curling table 100 is more than 2 m and less than 4 m wherein the width-to-length ratio of the culling table 100 has not to exceed to a ratio of 1:4.

When the width of the curling table 100 is less than 0.6 m, the width B1 of the upper plate surface portion 4 divided by the intermediate cushion bar 5 is less than 0.3 m and thus it is inconvenient to play the game, when the length of the curling table 100 is less than 2 m, the moving distance of the curling ball 10 is shortened, and when the length of the curling table 100 is more than 4 m, since the size of the curling table 100 is excessively large and there is a limit to the indoor installation thereof and the economic effect is reduced.

As shown in FIG. 4B, if the game system is operated such that the curling ball 10 is moved in the line b in the direction of the front cushion bar 3b by hitting at the hitting line 4a located at the front end of the rear cushion bar 3d, the curling ball 10 is reflected by the front cushion bar 3b and then reflected by the rear cushion bar 3d and then incident on the target 6. Therefore, this movement course has the effect of reciprocating the length A of the curling table 100 three times.

That is, the curling ball has the moving length 3A with respect to the length A of the curling table 100, and in this case, if the width-to-length ratio of the curling table 100 is set to 1:1.5, and then the middle cushion bar 5 is provided in the middle of the curling table 100 to divide the width into two, it becomes 0.5:1.5=1:3.

When the moving length of 3 times 3A is applied to the 1:3 ratio, the total moving distance of the curling table 100 can be 1:9. That is, the moving distance is 1:9 in a small curling table 100 having a width-to-length ratio of 1:1.5.

The total movement length of the curling ball 10 on the curling table 100 configured as shown in FIGS. 1 and 4 becomes A+A=2A=7 m, for example, when the length A of the curling table 100 is 3.5 m, the width is 1.5 m, and the intermediate cushion bar 5 is provided in the middle of the width and the culling ball 10 is reflected by the cushion bar 3 to be moved back and forth.

In other words, the upper plate surface portion 4 is divided into left and right by the intermediate cushion bar 5 and each width B1 is 0.75 m and the total moving length 2A is 7 m, and the ratio of B1:2A becomes about 1:9 and this is equal to 1:9 which is the ratio of conventional ice link curling sheet.

That is, even though the width-to-length of the curling table 100 is 1:2, since the moving distance by the operation system of the curling game apparatus according to the present invention becomes 1:9, even if a rectangular curling table 100 having a short length is provided, the moving distance effect of the curling ball can be obtained as the same as the curling table having a length nine times longer than the width while it is installed in a small indoor space.

In this configuration, the total moving distance of the curling stone on the ice link culling stadium of 45.72 m is reduced to the total moving distance of 7 m on the curling table 100, which is about 1/6.5.

Accordingly, in the present invention, the reduction ratio of all the apparatus components constituting the culling table 100 may be preferably the ration of 1/4 to 1/8 based on 1/6.5. That is, when the reduction ratio is 1/4 or less, the size of the curling table 100 becomes excessive, and when it is 1/8 or more, as the size of the curling table 100 is smaller, there is limit to various methods of attack and defense.

The target 6 is also provided by reducing the size at the ratio of 1/4 to 1/8 of the conventional ice link curling target. For example, when the diameter of the target 6 of the existing curling ice link sheet is 3.658 m, it is 0.915 m when the reduction ratio is set to 1/4, and the diameter of the target 6 becomes 0.45 m when the reduction ratio is 1/8. That is, the size of the scaled-down target 6 applied to the present invention is at least 0.45 m and at a maximum of 0.915 m.

Therefore, it is recommended that the width of the curling table 100 of the present invention is at least 0.45 m and less than a maximum of 1 m, and when it is divided into two by the intermediate cushion bar 5, the total width is set to be less than 2 m.

On the other hand, all the configuration of the cushion bar 3 including the intermediate cushion bar 5 is made of a material having good elasticity such as silicon, rubber, or urethane.

In the present invention, the cushion bar 3 includes the cushion bars 3a, 3b, 3c and 3d of left, right, front and rear and the intermediate cushion bar 5 as shown in FIGS. 4A and 4B.

Although the height of the cushion bar 3 is not limited, it may be a height at which the cushioning action can be maximized while the curling ball 10 does not deviate to the outside, that is, it may be 40% to 90% of the diameter of the curling ball 10. In addition, the shape of the vertical angle exposed outside may be a triangle, a quadrangle, or a pentagonal shape, and one side thereof may be exposed to the inside of the curling table 100 in the form of an angle formed by the angles such that the curling ball 10 is brought into contact with the vertical angle, thereby minimizing the friction and maximizing the elasticity so as to maintain the rotational force and the rotating direction of the curling ball 10 as much as possible.

For example, when the diameter of the curling ball 10 is 60 mm, the height of the cushion bar 3 at a vertical angle is set to be between 24 mm and 54 mm to smooth the reflection action of the curling ball at the cushion bar 3.

As shown in FIG. 3, the curling ball 10 is formed in the perfect spherical shape, and is made of a rigid body. The perfect spherical shape means an uniform and perfect circular shape. The rigid body refers to the solid character in which the size and shape do not change even when subjected to external forces. For example, it is made of a material such as stone, ivory, synthetic plastic, or metal, having no deformation against external force.

Since the diameter of the curling stone for the ice link is about 29.91 cm, the diameter of the curling ball 10 applied to the present invention is more than 3 cm and less than 8 cm when the reduction ratio of 1/4 to 1/8 is applied.

When the diameter of the curling ball 10 is less than 3 cm, the area of the hitting point 10C, which is a means of technical attack such as spinning of the curling ball 10 at the time of hitting, is small, and thus there is a limit, and when the diameter of the curling ball 10 is greater than 8 cm, the size of the curling ball 10 is too large compared to the size of the target 6, the target 6 is narrow, and thus there is a physical restriction on the game operation when a plurality of curling balls 10 are gathered into the target 6.

Since the curling ball 10 according to the present invention is formed with a rigid body in a complete spherical shape, the curling ball 10 moves through the sum of the translational motion of the center of mass around the rotational axis of the hitting point 10c of the curling ball 100 and the rotational motion around the axis of the center of mass.

That is, as shown in FIG. 4A, when the curling ball 10 is hit at a position a of the hitting line 4a, after the ball is first reflected by the left cushion bar 3a, it is reflected by the rear cushion bar 3d, and then reflected by the right cushion bar 3c, and after it is reflected again by the intermediate cushion bar 5, it enters into the target 6.

When the hitting line 4a is provided in front of the rear cushion bar 3d, as shown in FIG. 4B, and the curling ball 10 is struck, after the curling ball 10 is reflected by the front cushion bar 3b, as indicated with line a, it is reflected by the intermediate cushion bar 3 and it is reflected by the left cushion bar 3a, and it is incident on the rear cushion bar 3d to be reflected, it is reflected again by the right cushion bar 3c, and then after it is reflected by the intermediate cushion bar 5, it is incident on the target 6. In addition, when the curling ball 10 moves along the line b, it is possible to adopt a path directly incident to the target 6 via the front cushion bar 3b and the rear cushion bar 3d.

As described above, as an example of an attack or a defense by the method of operating the game in the curling game apparatus according to the present invention, various paths selection, the hitting power adjustment, the rotation angle adjustment, and the reflection angle of the cushion bar during the attack may be used.

The curling table 100 may be configured so that two hitting lines 4a are provided in two directions on the surface of the upper plate 2 of one curling table 100 as shown in FIG. 4B to select a necessary method for game.

The curling ball 10 in the form of a rigid ball has a certain hitting point 10c among various angles and positions such as 360 degrees in the vertical direction, 360 degrees in the left and right direction, and 360 degrees in the diagonal direction, as shown in FIG. 5(b) to FIG. 5(j), a certain point of which is the impact point 10C, and the curling ball an rotate around the axis of the hitting point 10C. The curling ball 10 in the form of a rigid ball moves through the translational motion of the center of mass around the rotational axis of the hitting point 10c of the curling ball 100 and the rotational motion around the axis of the center of mass at various angles such as 360 degrees in the vertical direction, 360 degrees in the left and right direction, and 360 degrees in the diagonal direction as shown in FIG. 5(j). This will be explained in more detail.

As a hitting means for striking the hitting point 10C of the curling ball 10 at the hitting line 4a, a cue (not shown) is used and after the hitting the curling ball 10 of a rigid body rotates at various angles. The material of such a cue (not shown) can be wood or synthetic plastics fishing rod material, having high strength.

That is, the curling ball 10 struck at the hitting line 4a, as shown in FIGS. 4A and 4B, is moved while rotating at various angles around the axis of the hitting point 10C, and the hitting point 10C for hitting the curling ball 10 with a cue (not shown) becomes the center of mass of the rotary motion of the culling ball 10.

Accordingly, the rotation movement of the curling ball can be made by the rotation angle of the center of mass and various reflection angles of the cushion bar 3.

In other words, when the curling ball 10 of the other party is at the center of the target 6, as shown in FIG. 5(a), one party pushes out the curling ball 10 of the other party by the sum of the translational motion of the center of mass and the rotational motion around the axis of the center of mass and the acceleration, using the appropriate force and the reflection angle of the cushion bar 3 with the curling ball 10a of the attacker, and thereby it is possible to perform a so-called take-out attack method for allowing the culling ball 10 of the attacker to be positioned closest to the center of the target 6 having a high score priority.

In addition, when the attacker strongly hits one curling ball 10a to start the game during a draw attack, since other curling balls 10a of the attacker may be also pushed out without being positioned at the center of the target 6 and further the curling ball 10 of the other party collides with the cushion bar 3 to enter into the target 6 again in some cases, and thus various draw and take-out attacks can be performed to cause the curling game to be fun.

It is possible to push out the curling ball 10 of the other party by sequentially hitting the curling ball 10 of the other party, which is positioned strategically in order to prevent the movement of the curling ball of one party.

For convenience of explanation, on the basis of the front surface of the curling ball 10, as shown in FIG. 5(*j*), the center of the left side in the 3 o'clock direction is set to 90° degrees clockwise, the center of the bottom side in the 6 o'clock direction is set to 180°, the center of the right side in the 9 o'clock direction is set to 270°, and the center of the upper side in the 12 o'clock direction is set to 360° (or 0°) of the total 360 degrees. A attacker hits the curling ball at fine and various angles ranging from 1° to 360° using a cue (not shown) as each attacker intends to hit.

For example, when the curling ball 10 is struck in the direction of the center of the upper end of 0 degree (360 degrees), as shown in FIG. 5(*b*), the curling ball rotates in the forward direction at an inclination angle of 0 degrees.

For example, the curling ball 10 of the attacker can be positioned in the middle of the target 6 by continuously moving in the forward direction with the acceleration force of the mass movement while striking and pushing out the curling ball 10*a* of the other party that blocks the front of the center of the target 6. In other words, the curling ball 10 of the attacker can push out the curling ball 10*a* of the other party that block its front, and simultaneously keeps moving forward with acceleration force to reach a desired position.

As shown in FIG. 5(*c*), in case the curling ball 10*a* of the other party is placed at the rear end from the center of the target 6, the curling ball 10 moves forward while rotating its mass movement in the upward direction from below when the hitting point 10C of the curling ball 10 of the attacker is struck at the bottom end in the direction of 180°, so that the curling ball 10 of the attacker can push out the curling ball 10*a* of the other party to be stopped or moved backward.

As shown in FIG. 5(*d*), when the curling ball 10*a* of the other party blocks the center of the target 6 at the left side of the center of the target 6, the attacker strikes the hitting point of the curling ball 10 in the direction of 310° clockwise, the curling ball 10 rotates in the forward direction at the angles of 310° to push out the curling ball 10*a* of the other party in the direction of the angle of 310° around the center of the target 6 and the curling ball 10*a* of the attacker moves rightward at a right angle of 90°.

In addition, as shown in FIG. 5(*e*), when the curling ball 10*a* of the other party exists in the direction of 100° around the center of the target 6, the curling ball 10 of the attacker strikes and pushes out the curling ball 10*a* of the other party while rotating at the angle of 100° and to be placed on the center of the target 6.

Meanwhile, as shown in FIG. 5(*f*), when there are two of the first curling ball 10*a* and the second curling ball 10*b* of the other party are provided, the point at around 290° of the hitting point 10*c* of the curling ball 10 of the attacker is struck to push out the first curling ball 10*a* and the second curling balls 10*b* of the other party such that the curling ball 10 of the attacker is placed on a desired position.

FIG. 5(*g*) shows the same logic as FIG. 3(*f*) even though the hitting point is in the opposite direction. However, the first and second curling balls 10*a* and 10*b* of the other party are in the opposite direction as compared to FIG. 5(*f*).

As shown in FIG. 5(*h*), when the cushion bar 3 is used, the reflection angle of the curling ball 10 is large when the hitting point 10C is struck at the angles between 0° to 90° and 0° to 180°.

In addition, as shown in FIG. 5(*i*), when the hitting point 10C is struck at the angles between 270° to 360°, the reflection angle is small, but when the hitting point 10C is struck at the angles between 180° to 270°, the reflection angle becomes large.

The reflective cushioning action can be appropriately increased or decreased, so that a desired attack and defense can be performed.

As shown in FIG. 5, when a certain portion of the curling ball 10 is struck using an instrument such as a cue (not shown), the struck hitting point becomes a shaft of rotation around the force of acceleration and the mass of the center of the rigid body, and thereby, the curling ball can finely perform the rotational motion from 10 to 360° around a shaft of the center of the mass.

That is, the attacker may strike the hitting point 10C of the curling ball 10*a* at an appropriate angle between 0° and 359° with an appropriate force.

By adjusting the strength of the striking force the speed of rotation and acceleration of the curling ball and the total rotational force are adjusted.

The above-described playing method is an example of explanation for facilitating understanding. Since the curling ball 10 of the attacker is varied by the thickness of the curling ball 10*a* of the other party, the rotational angle to be struck, and the striking force, it is possible to configure a curling game in which a variety of high-level attack and defense techniques can be performed.

The curling game rule for the curling table 100 in the curling game apparatus according to the present invention is applied with the rule of the ice link curling game, but it is not limited thereto and can be variously operated.

That is, it is possible to play both 1:1 games and games in which a large number of people have formed a team, setting the first and later attack, and then have the right to attack in turn.

That is, the curling game apparatus according to the present invention is allowed to operate with a rule that the final curling ball 10 nearest to the center within the target 6 gets a score.

As described above, the various components of the present invention systematically interact with each other, so that it is possible to operate games and play a variety of games by a variety of attack and defense technologies as well as a draw attack and a take-out attack, which are features of a curling game, by various angles of rotation of the curling ball, as compared with the conventional curling games.

Accordingly, the present invention differs from the conventional scoring-oriented indoor recording game in its configuration and game format as described above, and the curling game using various attacks and defenses with the cushion is different from the conventional curling game. That is, the present invention provides a new indoor curling game apparatus capable of creatively using various attack techniques and defense techniques.

Embodiment 2

The configuration of embodiment 2 of the curling game apparatus according to the present invention is explained with reference to FIG. 6. Here, the same components as embodiment 1 are denoted by the same reference numerals, and a repetitive description thereof is omitted.

Figure 6:
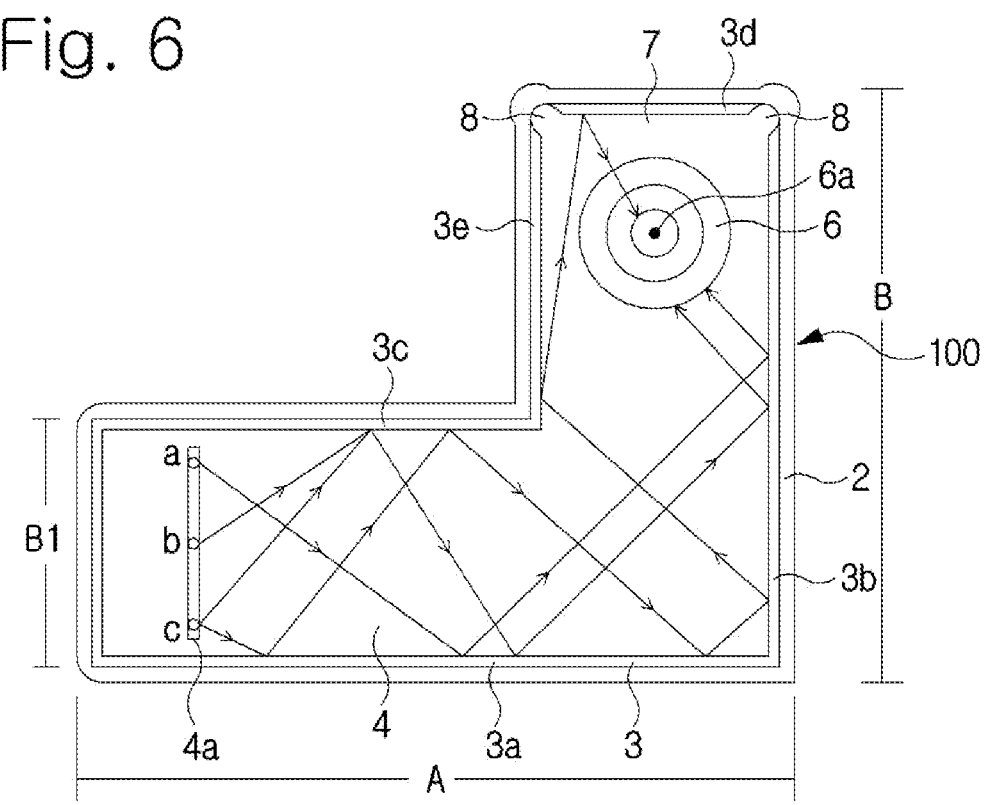
FIG. 6 is a perspective view for explaining a basic configuration of a curling game apparatus according to a second embodiment of the present invention.

FIG. 6 is a perspective view for explaining a basic configuration of the curling game apparatus according to embodiment 2 of the present invention.

The curling game apparatus according to the embodiment 2 of the present invention is provided with the curling table 100 in "¬" shape as shown in FIG. 6. That is, the upper plate 2 is provided in "¬" shape in the horizontal direction, and thus the upper plate surface portion 4 is also provided in "¬" shape, and two cushion bars 3 are provided around the upper plate surface portion 4 in "¬" shape. Therefore, the cushion bars 3 are provided in the order of 3*a*, 3*b*, 3*d*, 3*e* and 3*c*, as shown in FIG. 6.

In addition, a hitting line 4*a* is provided at the front end of the cushion bar 3, and the target 6 is provided at the rear end of "¬" shaped cushion bar 3, as shown in FIG. 6.

Therefore, according to the operating method of the curling game apparatus according to embodiment 2 of the present invention, since the curling ball 10 is incident on the target 6 via the plurality of cushion bars 3*a*, 3*b*, 3*d*, 3*e*, 3*c*, the moving distance on the small curling table 100 is increased by three times or more.

Embodiment 3

The configuration of embodiment 3 of the curling game apparatus according to the present invention is explained with reference to FIG. 7. Here, the same components as embodiment 1 are denoted by the same reference numerals, and a repetitive description thereof is omitted.

Figure 7:
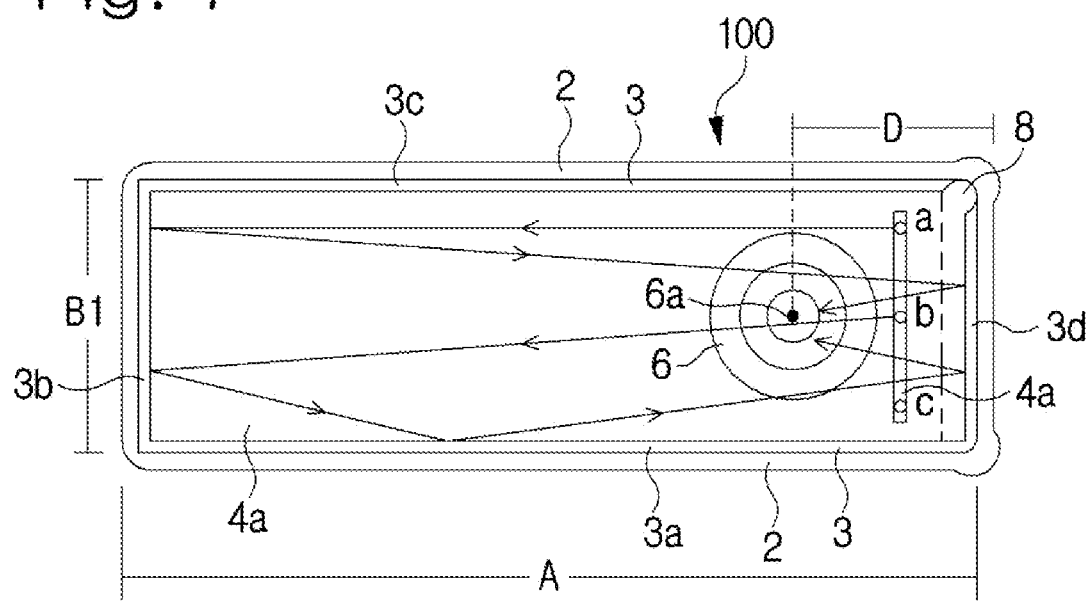
FIG. 7 is a perspective view for explaining a basic configuration of a curling game apparatus according to a third embodiment of the present invention.

FIG. 7 is a perspective view for explaining a basic configuration of a curling game apparatus according to embodiment 3 of the present invention.

According to the curling game apparatus of the embodiment 3 the width-to-length ratio of the culling table 100 is set to 1:4 or less, as shown in FIG. 7, and according to the operation method of the curling game apparatus the total moving distance of the curling ball 10 is increased by 2 to 3 times with reciprocating A distance by the front and rear cushion bars 3*b*, 3*d* and is reflected again as much as D distance by the rear cushion bar 3*d* to be incident on the target 6.

In other words, the target 6 is provided between the front and rear cushion bars 3*b* and 3*d* as shown in FIG. 7, and the hitting line 4*a* is provided in front of a player between the target 6 and the rear cushion bar 3*d*. In addition, the cushion bars 3 are provided with the front, rear, left and right cushion bars 3*b*, 3*d*, 3*a* and 3*c*.

That is, the position of the target 6 may be provided between the front cushion bar 3*b* and the rear cushion bar 3*d*, and the distance of D may be increased as shown in FIG. 7.

In this case, the curling ball 10 starting from the hitting line 4*a* is reflected by the front cushion bar 3*b*, reflected again by the rear cushion bar 3*d*, and then incident on the target 6 at the D position.

At this time, the total moving distance of the curling ball 10 becomes A+A+D in comparison with the length A of the curling table, which is 2.5 times of A.

When the total moving distance A+A+D=2.5A is applied to the width-to-length ratio of 1:4 of the curling table 100, the moving distance becomes about 1:10.

For example, the curling ball 10 hit at the position b is reflected by the front cushion bar 3*b*, and reflected again by the left cushion bar 3*a*, and then reflected by the rear cushion bar 3*d* so as to be incident on the target 6.

The moving distance of the curling ball 10 is 2 to 2.5 times in comparison with the length A of the curling table 100. Therefore, considering the width-to-length ratio of the curling table 100 of 1:4, since the moving distance of the curling ball 10 is about the ratio of 1:8 to 1:10, it matches with the standard moving distance ratio of about 1:5 to 1:10 and it corresponds to the 1:9 ratio of the width-to-length of the existing curling stone stadium.

Embodiment 4

The configuration of the curling game apparatus in embodiment 4 according to the present invention is explained with reference to FIGS. 8 and 9. Here, the same components as embodiment 1 are denoted by the same reference numerals, and a repetitive description thereof is omitted.

Figure 8:
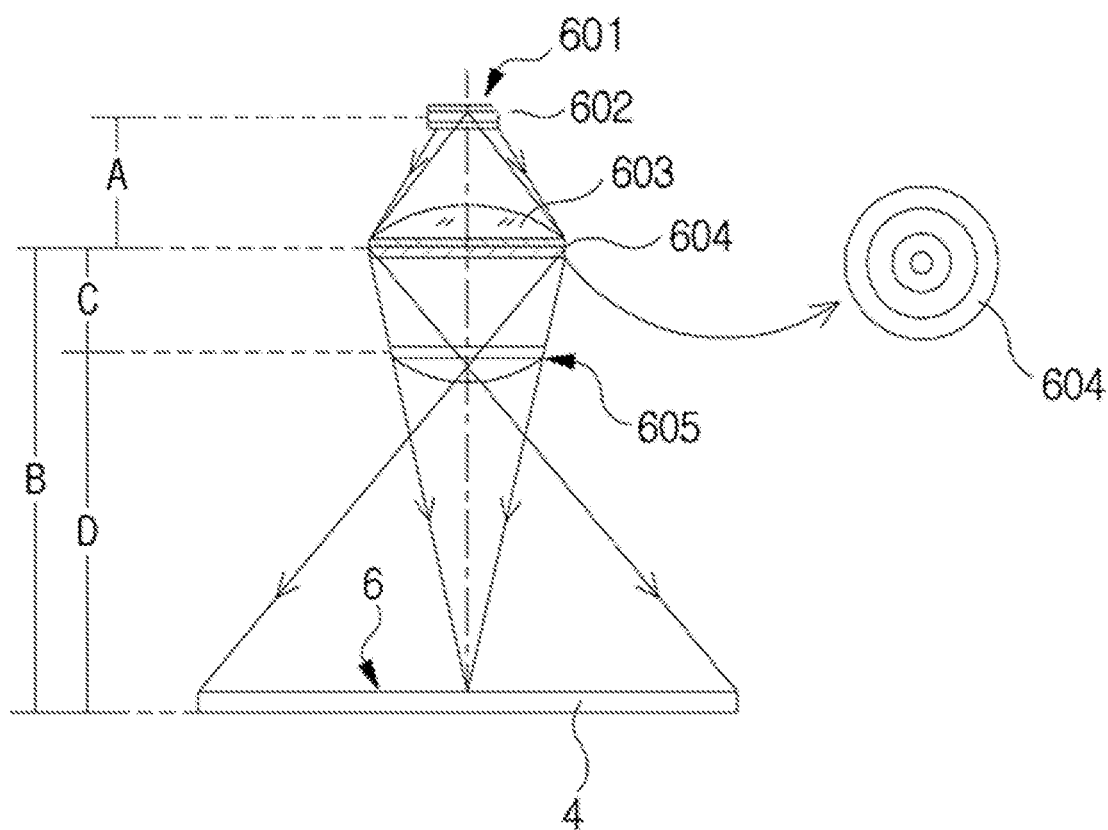
FIG. 8 is a view illustrating a target light projector in the curling game apparatus according to a fourth embodiment of the present invention.

FIG. 8 is a view illustrating a target light projector in a curling game apparatus according to embodiment 4 of the present invention, and FIG. 9 is a view illustrating a using state of the target light projector shown in FIG. 8.

In embodiments 1 to 3, the shape of the target 6 is displayed on the upper plate surface portion 4 of the curling table 100 by various methods such as a printing method.

Meanwhile, the curling game apparatus according to embodiment 4 of the present invention may be provided with a target light projector 601 as shown in FIG. 8 for projecting on the surface of the curling table 100 so as to obtain a precise and uniform surface thereon without obstructing the movement of the curling ball 10.

As shown in FIG. 8, the target light projector 601 according to embodiment 4 of the present invention includes a light source 602 such as an LED lamp, a light collection lens 603 provided at the lower end of the light source 602, a target shape plate 604 through which the light collected by the light collection lens 603 is transmitted and on which a circle overlapped target like the target 6, and a projection lens 605 for adjusting the focal distance of the light transmitted through the target shape plate 604.

The light source 602, the target shape plate 604, and the projection lens 605 constitute essential components of the target light projector 601. That is, the magnifying size of the target shape plate 604 projected by the projection lens 605 becomes R/Q.

The light source 602 of the target light projector 601 is collected by the light collecting lens 603, and is transmitted through the target shape plate 604, and then is projected onto the upper plate surface portion 4 of the curling table 100 by the projection lens 605.

Since the target 6 is formed by the light source 602, it does not hinder the uniformity on the surface of the upper plate surface portion 4 of the curling table 100 and does not obstruct the movement of the curling ball 10.

In addition, as shown in FIG. 9, the target 6 is formed of a target groove 6*a* in the center of the target 6 and a ball guide 6*b* is formed in the bottom of the target groove 6*a* wherein when the curling ball 10 is inserted into the target groove 6*a*, it is possible to apply various regulations such as adding additional points or adding penalty points in reverse.

In addition, the target 6 and the hitting line 4*a* may be formed of a plurality of, for example, both sides, and may play in both directions.

According to the curling game provided with the curling table 100 as described above, the plurality of curling balls 10 are struck in order, and the score is determined finally by the number of curling balls 10 closest to the target in comparison with the curling ball 10 of other party, and thereby it is possible to use a variety of techniques and strategies, such as attacks and defenses from various cushion angles as well as draw and take-out attacks, which cannot be compared with conventional curling.

For example, the curling game is played such that a team is formed of one to four players at the first inning wherein the end attacking team repeatedly places the curling balls on the centers of target 6 by ten curling balls with ten times while pushing out continuously the interrupting curling ball of the earlier attacking team to have a high probability of acquiring a score of one point and a maximum of two or three points, and thus it is possible to derive a dramatic reversal, which is an important element of the sporting event. A camera may be provided on the top of the target 6 to view the score scene on a large monitor or a screen.

Therefore, according to the culling table 100 of the present invention provides a variety of techniques and strategies using the rotation angle around the center of mass by hitting the curing balls at 360 degrees before and after on the culling table 100, various cushioning techniques, rotation acceleration, and adjustment of hitting force, thereby enjoying new techniques of curling sports on the indoor table.

As described above, according to the curling game apparatus of the present invention, it is possible to play the same game as a real curling game on a curling table. The curling game apparatus is provided with a curling table formed in a rectangular shape on the upper part of the main body and a curling ball formed in the form of a perfect spherical shape as a rigid body and moved on the curling table which is provided by proportionally reducing the size and all game elements of the international ice link curling stadium (hereinafter referred to as the "ice link stadium") with the length of 42.07 to 45.72 m and the width of 4.72 to 5 m. That is, it is possible to achieve the effect of the conventional curling game by constituting the curling table by reducing the ratio of the total moving distance, the size of curling ball, and the size of the target in the proportion of more than 1/4 and less than 1/8.

According to the curling game apparatus of the present invention, it enables a plurality of devices to be installed in various rooms by reducing the size of a curling table in the area ratio of 1/16 to 1/64 of the ice link curling stadium. The width to the length of the curling table is formed in the ratio of less than 1:4 so that a large number of curling tables can be installed in various types of rooms, thereby achieving economic efficiency.

The curling game apparatus according to the present invention is provided with a middle cushion bar in the middle of the width of the curling table on at least two or more sides and the hitting line and the target position of the curling ball are changeable to extend the ratio of the width of the curling table to the total moving distance of the curling ball up to 1:10 so as to configure a table structure having a short length, and thus a plurality of tables can be installed in an indoor space, thereby achieving the effect of a curling table having a long moving distance same as in the existing curling game, by using the various attacking and defending methods.

Further, according to the curling game apparatus of the present invention the curling ball is composed of a rigid body and performs the sum of the translational motion of the center of mass and the rotational motion around the axis of the center of mass, the acceleration and the rotational motion proportional to the whole rotation force, thereby achieving the effect that various attacks, defenses and movement methods can be performed.

According to the curling game apparatus of the present invention the curling ball continuously rotates by forming a structure that the cushion bar around the curling table is made of urethane or rubber and providing the cushion bar formed at the perfect angle of the triangular shape at a height of more than 40% to less than 90% of the curling ball height to touch only a part of the curling ball, and achieves the effect that the method of various attacks and defends can be performed by moving the curling ball to the target through the incident angle and the reflection angle by using various angles of the cushion.

Further, according to the curling game apparatus of the present invention the woven fabric itself on the surface of the curling table is shaped into the target or the target is provided by projecting a target shape by a projector, thereby achieving the effect that the curling ball can continue to move uniformly even on the target.

Although the present invention has been described in detail with reference to the above embodiments, it is needless to say that the present invention is not limited to the above-described embodiments, and various modifications may be made without departing from the spirit of the present invention.

What is claimed is:

1. A curling game apparatus, capable of playing a curling game on a table, comprising:
   a main body;
   a curling table having a rectangular shape provided on the upper portion of the main body;
   an upper plate surface portion provided with a hitting line and a target on the surface of the curling table, the upper plate portion having a longitudinal direction and a lateral direction; and
   a cushion bar provided around a perimeter of the upper plate surface portion and an intermediate cushion bar is provided in the middle of the width of the curling table in a longitudinal direction, the cushion bar and intermediate cushion bar being arranged to drive a curling ball to the upper plate surface portion,
   wherein the curling ball, formed in the shape of a sphere as a rigid body, is driven on the upper plate surface portion with rotational force and acceleration force at a rotational angle rotating in a direction of any one of up, down, left, right, and diagonal directions around a striking point as a rotational axis when a point of the curling ball is hit as a striking point,
   the surface of the upper plate surface portion is formed of flock papers having no fluff to minimize the rotation angle, frictional force, and rotational force of the curling ball,
   the cushion bar is formed in an elastic triangle shape to change the driving direction while minimizing the contact surface with the cushion bar in the state of maintaining the rotation angle, rotational force, and acceleration force of the curling ball, and
   the intermediate cushion bar is provided with a cushion function on both sides of the intermediate cushion bar,
   so that the curling ball, a certain hit point of which is hit at the hitting line to be reflected at the cushion bar and the intermediate cushion bar in the driving process, drives on the upper plate surface portion around the hitting point which is a rotational axis and a center of mass, and move to the target,
   and the curling ball moves while minimizing the friction by the rotational force and the acceleration force in the moving process, thereby performing various attacks and defenses by adjusting the movement path and the impact force adjustment rotation angle of the curling ball in the spherical shape.

2. The curling game apparatus of claim 1, wherein the target is formed by a target light projector comprising at least a light source, a target plate and a projection lens, and a shape of the target plate is projected on the upper plate surface portion.

* * * * *